(No Model.) 2 Sheets—Sheet 1.
J. R. COOK.
COTTON PLANTER.
No. 413,033. Patented Oct. 15, 1889.
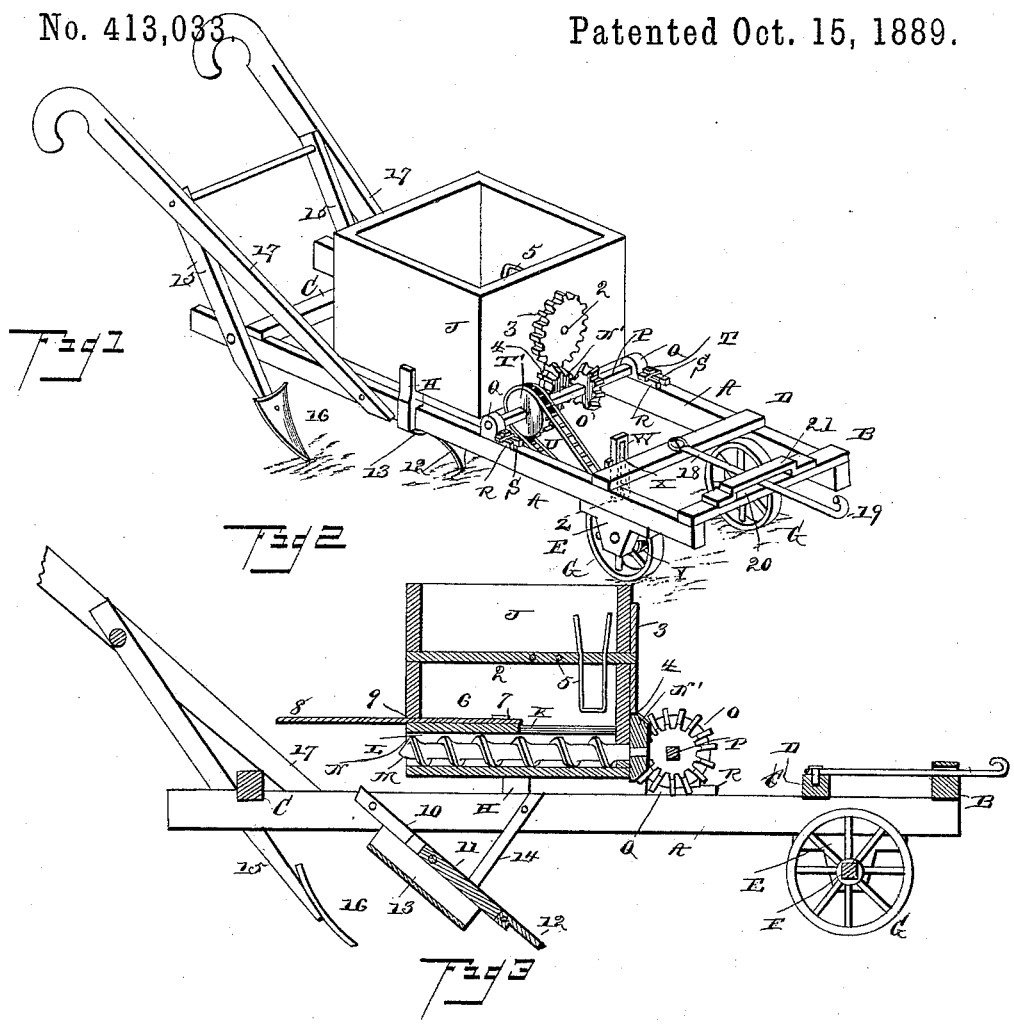
Witnesses
John Imirie
Wm. Bagger
Inventor
John R. Cook
By his Attorneys,
C. A. Snow & Co.

(No Model.)  2 Sheets—Sheet 2.
J. R. COOK.
COTTON PLANTER.
No. 413,033. Patented Oct. 15, 1889.
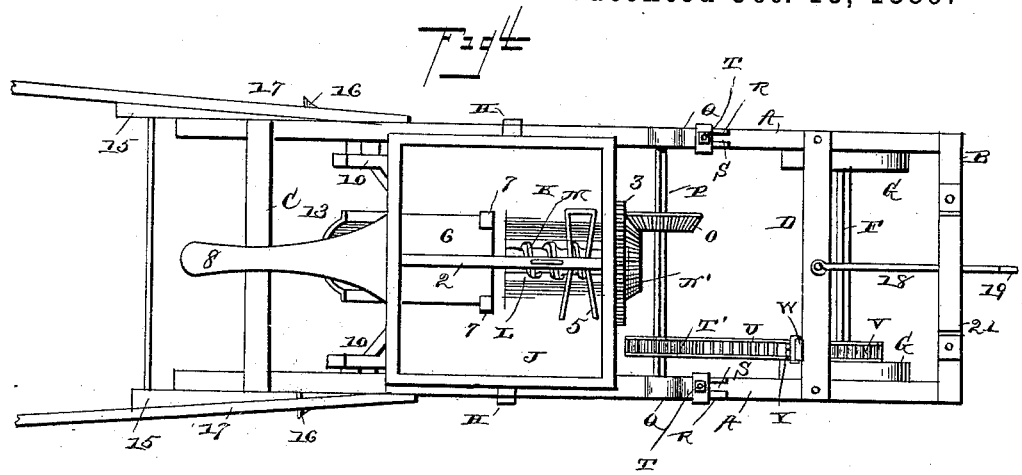
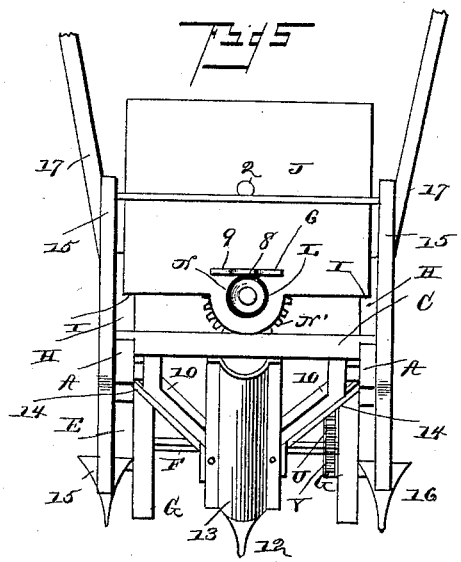
Witnesses
John Smirel
Wm. Bagger
Inventor
John R Cook
By his Attorneys,
C A Snow & Co.

UNITED STATES PATENT OFFICE.

JOHN R. COOK, OF HICO, TEXAS.

COTTON-PLANTER.

SPECIFICATION forming part of Letters Patent No. 413,033, dated October 15, 1889.

Application filed May 15, 1889. Serial No. 310,861. (No model.)

*To all whom it may concern:*

Be it known that I, JOHN R. COOK, a citizen of the United States, residing at Hico, in the county of Hamilton and State of Texas, have invented a new and useful Cotton-Planter, of which the following is a specification.

This invention relates to cotton-planters; and it has for its object to provide a device which shall be simple in construction and by means of which the planting of the seed may be performed in an even and regular manner.

The invention consists in the improved construction, arrangement, and combination of parts, which will be hereinafter fully described, and particularly pointed out in the claim.

In the drawings, Figure 1 is a perspective view of my improved cotton-planter. Fig. 2 is a longitudinal sectional view of the same. Fig. 3 is a vertical transverse section taken through the seed box or hopper. Fig. 4 is a top plan. Fig. 5 is a rear view.

The same letters refer to the same parts in all the figures.

The frame of my improved cotton-planter is composed of the longitudinal parallel side beams A A, connected at or near their front ends by cross-beams B C, and at some distance from their front ends by an additional cross-piece D.

E E designate boxes upon the under sides of the side beams A A, near the ends of the latter, and affording bearings for the axle F, which revolves in said bearings and is provided with the supporting-wheels G G.

H H are vertical standards or supports mounted upon the side beams A A and having shoulders I, upon which the seed box or hopper J is supported and firmly secured. Said box or hopper may consist of an ordinary rectangular box, the bottom of which K is provided with a longitudinal cylindrical groove or recess L, in which is mounted a spirally-threaded conveyer-shaft M, which extends through an opening N in the rear end of the hopper, and the front end of which likewise extends through the front end of the hopper and is provided with a bevel-gear N', meshing with a pinion O, which is mounted upon a shaft P, having its bearings in the boxes Q Q, which are mounted upon the longitudinal side pieces A A of the frame. The boxes Q Q are provided with flanges R, having longitudinal slots S to receive the bolt T, by means of which said boxes are secured to the side pieces of the frame, upon which the said boxes are in this manner rendered longitudinally adjustable. The shaft P is provided with a sprocket-wheel T', which is connected by a chain U with a sprocket-wheel V, secured upon the axle F, from which motion may in this manner be conveyed to the shaft P and to the longitudinal worm or feed shaft in the bottom of the hopper.

W designates an arm having a vertical slot X, to receive a bolt Y, by means of which the said arm is secured vertically adjustably upon the rear side of the cross-piece D of the frame. Said arm carries at its lower end a friction-roller Z, adapted to bear against the chain U, which may in this manner be tightened sufficiently to operate with certainty.

The front and rear ends of the hopper J are provided with bearings for a longitudinal shaft 2, the front end of which is provided with a spur-wheel 3, adapted to mesh with and be operated by the teeth of the pinion 4, which may be formed integrally with the bevel-gear N upon the front end of the feed-shaft or spiral conveyer. The shaft 2 is provided with the radially-extending fingers or agitators 5, by means of which the contents of the feed box or hopper are stirred. The bottom of the feed-box is provided with a longitudinally-movable slide 6, which works in guides 7 7, and by means of which the slot L may be wholly or partially covered, so as to admit the seed in any desired quantity to the conveyer-shaft. The rear end of the slide 6 is provided with a shank or handle 8, extending through the slot 9 in the rear end of the box or hopper, and which may be conveniently reached by the operator, who may thus regulate the quantity of seed dropped by the machine while the latter is in motion.

To the inner sides of the side pieces of the frame, in rear of the hopper J, are pivoted a pair of arms 10 10, the lower ends of which are curved toward each other, and between which is secured the shank or standard 11 of the furrow-opener 12, which latter may be secured to the said standard by means of a pivotal bolt and a break-pin, so as to give way without injury to any of the parts of the machine in case obstructions should be encountered in the nature of rocks or stumps.

To the under or rear sides of the arms 10 10, I secure an inclined chute 13, the upper end of which is directly below the opening N, through which the seed escapes at the rear end of the hopper, and which serves to convey the seed to the furrow. The arms 10 10 are connected with the sides of the frame by means of inclined braces 14 14, and the said arms, with their attachments, are thereby retained in position for operation. Standards 15 15, to the lower end of which the coverers 16 are attached, are suitably connected to the rear ends of the side pieces of the frame, and the upper ends of said standards are likewise connected with the sides of the frame by the handles 17 17, which are grasped by the operator, who may thereby steer the machine when in motion.

Pivotally attached to the upper side of the cross-piece D, near the front end of the frame, is a forwardly-extending rod 18, the front end of which is provided with a hook 19, to which the draft may be attached. The front end of the said rod moves laterally in a slot 20, formed in a bracket 21, attached to the upper side of the front piece B of the frame, said slot serving to confine the motion of the rod 18 within proper limits. Owing to this method of connecting the draft to the machine the latter will be in no wise affected by the irregular movement of the team, but will move smoothly and evenly over the ground.

The operation and advantages of my invention will be readily understood from the foregoing description, taken in connection with the drawings.

The construction of the machine is simple and inexpensive, the spiral conveyer-shaft performs the operation of dropping the seed with regularity and accuracy, and the machine is capable of being operated and handled conveniently by a single man.

Having thus described my invention, I claim and desire to secure by Letters Patent of the United States—

In a cotton-planter, the combination of a rectangular frame provided near its front end with an axle having the transporting-wheels, the hopper having a longitudinally-grooved bottom in which is mounted a spirally-threaded conveyer extending through the rear end of said hopper, a transverse shaft in front of the hopper, having a sprocket-wheel connected by a chain with a sprocket-wheel upon the axle, intermeshing pinions upon the transverse shaft and the conveyer-shaft, a regulating-slide, a shaft mounted longitudinally in the hopper and having a series of agitators and provided at its front end with a pinion meshing with a spur-wheel upon the conveyer-shaft, the arms 10, carrying the shank of the furrow-opener and having an inclined chute secured to their rear sides, the standards connected to the rear end of the frame and having the coverers, and the handles, all arranged and combined to form an organized machine, as herein set forth.

In testimony that I claim the foregoing as my own I have hereto affixed my signature in presence of two witnesses.

JOHN R. COOK.

Witnesses:
F. H. SNIDER,
A. O. GRAVES.